United States Patent [19]

Brown, deceased

[11] 4,049,015

[45] Sept. 20, 1977

[54] CHECK VALVE ASSEMBLY

[75] Inventor: Cicero C. Brown, deceased, late of Houston, Tex., by Joe R. Brown, executor

[73] Assignee: Brown Oil Tools, Inc., Houston, Tex.

[21] Appl. No.: 654,522

[22] Filed: Feb. 2, 1976

Related U.S. Application Data

[60] Continuation-in-part of Ser. No. 495,901, Aug. 8, 1974, which is a division of Ser. No. 322,226, Jan. 9, 1973, Pat. No. 3,850,191.

[51] Int. Cl.$^2$ ............................................. F16K 15/04
[52] U.S. Cl. ................................. 137/496; 137/519.5; 137/533.11; 137/533.15; 166/328
[58] Field of Search ...................... 137/533.11, 533.13, 137/533.15, 495, 496, 498, 460, 519.5; 166/224 R, 226, 225

[56] References Cited

U.S. PATENT DOCUMENTS

| 193,605 | 7/1877 | Hay | 137/519.5 |
|---|---|---|---|
| 2,320,670 | 6/1943 | Scaramucci | 166/225 |
| 3,269,463 | 8/1966 | Page, Jr. | 166/224 R |
| 3,332,497 | 7/1967 | Page, Jr. | 166/224 R |
| 3,334,697 | 8/1967 | Edwards et al. | 166/224 R X |
| 3,584,645 | 6/1971 | Radig | 137/519.5 X |

Primary Examiner—William R. Cline
Attorney, Agent, or Firm—Browning, Bushman & Zamecki

[57] ABSTRACT

A check valve assembly for use in a drill string to limit reverse flow of drilling fluid through the string while permitting such fluid to be pumped freely into the well under normal conditions. The assembly may include: a valve body having a longitudinal flowbore therethrough; a valve seat at one end of the flowbore; a pair of inclined cylindrical recesses in the valve body communicating with the flowbore; and a ball member normally disposed in either one of the recesses and movable into the flowbore for sealing engagement with the seat in response to a predetermined rate of reverse flow through the flowbore.

6 Claims, 2 Drawing Figures

CHECK VALVE ASSEMBLY

CROSS-REFERENCE TO RELATED APPLICATIONS

The present application is a continuation-in-part of application Ser. No. 495,901, filed Aug. 8, 1974, which is a division of application Ser. No. 322,226, filed Jan. 9, 1973, now issued as U.S. Pat. No. 3,850,191. It is requested that all patent references cited in these cases be made of record in the present application

BACKGROUND OF THE INVENTION

1. Field of the Invention

The present invention relates to means of limiting reverse fluid flow through conduits. More specifically, the present invention relates to a check valve assembly suitable for employment in a drill string in which drilling fluid or "mud" is being pumped downwardly through the string. The assembly is designed to limit upward flow of fluids when the drill bit enters a high pressure area.

2. Description of the Prior Art

When drilling a well, there may arise a need for a device to prevent the uncontrolled upward flow of the drilling fluid or "mud" in the drill string, e.g., should the drill bit enters a high pressure area. Under normal operating conditions, the device should allow unrestricted downward flow of the mud.

The prior art has suggested a number of valve assemblies designed to allow fluids or effluent materials to be pumped down through a drill string and to prevent reverse or upward flow therethrough. See, for example, U.S. Pat. Nos. 1,577,740 and 1,790,480.

If the valve elements are directly in the flow stream, the materials pumped down through the drill string may erosively wear the valve components, particularly when such materials carry abrasive particles. Previous check valve devices have employed a ball valve member and a seat member, along with a retainer or cage assembly. In these devices, the valve assembly is located directly in the flow stream and therefore subjected to the erosive action of abrasive material in the fluid. Such valves also restrict the downward flow of fluid and, with the valve assembly located directly in the flow stream, it is impossible for equipment to be lowered through the drill string past the assembly.

During drilling operations, the drill string may frequently be removed from the bore for maintenance of the drill bit. The valve assembly should allow fluid to empty from the drill string when it is raised from the bore. It is preferable that the valve assembly also allow fluid to flow at a limited rate upward past the assembly when the drill string is being lowered into the well bore. By allowing the drill string to fill from the bottom, fluid does not have to be pumped in at the top to lower the drill string and to prevent the drill string from collapsing because of pressure differentials. Valve assemblies previously used, either allow no reverse fluid flow, or a predetermined amount of flow at all times. The valve that allows fluid to flow all the time is undesirable. Such a valve works fine when lowering the drill string into the well bore; but, when the drill bit enters a high pressure area, the flow can never be completely stopped.

Other devices have been designed to control only the upward flow of fluid in well tubing and are not designed for use in a drill string, where fluid is allowed in both directions. These devices are used in production strings to shut off the flow of oil if damage occurs to equipment at the wellhead. Many of these devices have a ball valve located in a side pocket out of the flow stream and a movable inner sleeve for displacing the ball from the side pocket when the differential pressure is increased sufficiently.

In the aforementioned U.S. Pat. No. 3,850,191, a new and improved drill string check valve assembly is disclosed which provides an unrestricted flow path for unrestricted downward flow and passage of flowline equipment; but, which is provided with means for regulating the rate of reverse flow so that the drill string can be lowered into the well bore without having to pump fluid into the top of the drill string. In such a check valve, a tubular housing is provided, having a recess in its wall, for normally retaining a ball valve closure member out of the flow stream. Thus, the ball itself doesn't restrict the downward flow of fluid and is at least partially protected from erosion by abrasive material in the fluid. In its preferred form, the closed end of the ball recess may also communicate with the flowbore through a pressure equalizing passage by which the rate of reverse flow can be regulated. Although such a check valve assembly is superior to those of the prior art, the recess, and to some degree, the ball member itself, is still subject to some degree of erosion.

SUMMARY OF THE INVENTION

The present invention provides an improved version of the check valve assembly of U.S. Pat. No. 3,850,191. Its construction further reduces the effects of erosion, resulting in a more efficient and reliable check valve.

Like in the original embodiment, the check valve of the present invention comprises: a valve body having a longitudinal flowbore therethrough; seat means carried by the valve body at one end of the flowbore; and a ball closure means for disposal in a recess for movement into the flowbore for sealing engagement with the seat means, in response to a predetermined rate of reverse flow through the check valve assembly. However, instead of only one recess for disposal of the ball member, the present invention provides a pair of recesses in either one of which the ball member may be disposed. In a preferred embodiment of the invention, the recesses are symmetrically and directly opposed from each other relative to the flowbore. Thus, after entering the flowbore for seating against the seat member, the ball member, upon a reduction in reverse flow, may reenter either one of the recesses, without preference to either. This arrangement materially reduces erosion to the recesses upon continued operation, resulting in a check valve which has a longer life and greater reliability.

The closed end of each of the recesses may also communicate with the flowbore, via a pressure equalizing passage, so that changing of orifice bushings therein can regulate or determine the reverse flow rate at which the check valve will operate.

The foregoing and other features and advantages of the present invention will be more fully understood from the following specification, claims and related drawings.

DESCRIPTION OF THE PREFERRED EMBODIMENT

Figure 1:
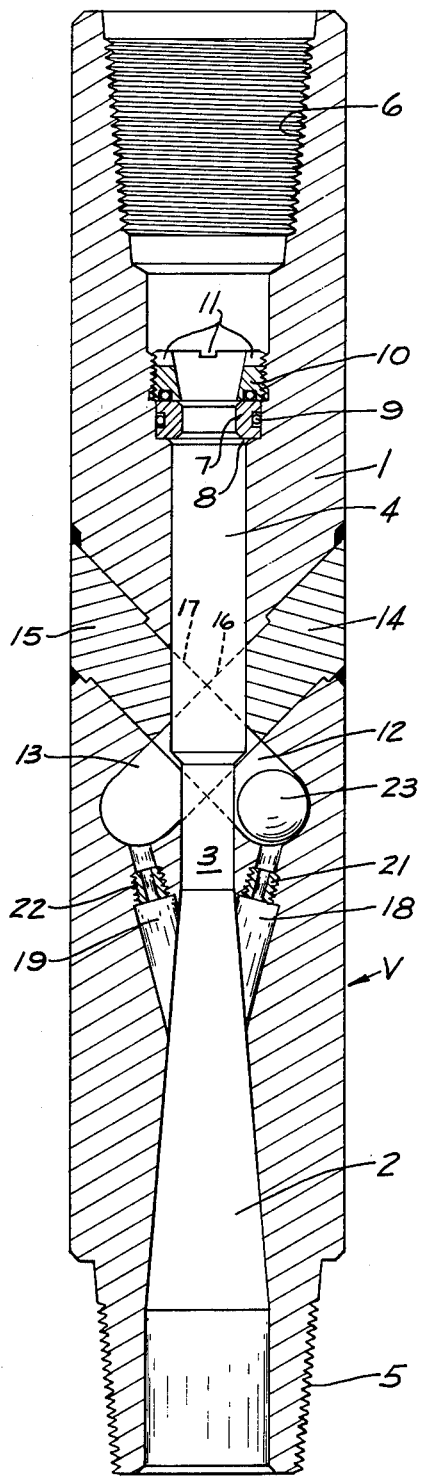
FIG. 1 is a vertical elevation, in section, of a check valve assembly according to a preferred embodiment of the invention and illustrating the check valve in the opened or inoperative position.

Referring to the drawings, the check valve V of the present invention comprises a cylindrical body 1, having a longitudinal flowbore therethrough, divided into three distinct sections: a converging lower frusto-conical section 2, a restricted central throat section 3 and an upper cylindrical section 4. A threaded pin 5 at the lower end of the assembly and a threaded box 6 at the upper end of the assembly permit connection of the valve assembly V in a drill string above the drill bit (not shown).

Located at the upper end of flowbore section 4 is a valve seat bushing 7 having an annular seating surface 8 thereon. A resilient O-ring seal 9 encircles the bushing 7 and forms a fluidtight seal between the bushing 7 and body 1. To allow for replacement of the bushing 7 and to maintain the correct positioning thereof, an externally threaded lock nut 10 is positioned above the bushing. The lock nut 10 may be provided with slots 11 for engagement with any suitable tool to remove the lock nut for replacement of the bushing 7.

A pair of inclined cylindrical recesses or pockets 12 and 13 communicate with the flowbore near the junction of upper section 4 and central section 3. These pockets may be initially formed by inclined drilling from the outside of the valve body and replacing a portion of the drilled out area with plugs 14 and 15. The drilling, not only produces the recesses 12 and 13, but also provides transition guide areas 16 and 17 from the recesses to the flowbore.

Pressure equalizing passages 18 and 19 may be provided between the closed ends of the recesses 12 and 13 and the lower flowbore section 2. These passages may include a reduced diameter section threaded for receiving externally threaded orifice bushings 21 and 22. The positioning of the passages 18 and 19 may be such as to allow removal of the orifice bushing 21 and 22 from the lower flowbore section 2. It is the size of the orifice 21 and 22 which determines the reverse flow rate permitted.

During drilling operations, fluid is pumped down through the drill string, in which the valve assembly V is installed, through the flowbore sections 4, 3, and 2 and out the drill bit connected therebelow (not shown). The fluid assists the mechanical action of the drill bit and returns cutting to the surface of the well. In addition, when the drill string has to be removed from the well bore, the hydrostatic pressure of the fluid will seal the well bore.

When drilling resumes, after removal of the drill bit, the drill string must again be lowered into the well bore. The drill string is lowered by gravity, until the weight of the fluid displaced by the drill string equals the weight of the drill string. It is then normally necessary to either pump fluid into the top of the drill string to increase its weight or to have a valve assembly, such as the one described herein, to allow the drill string to fill from the bottom. Therefore, it is desirable to have a check valve assembly with reverse flow capabilities like the valve V of the present invention. But, the reverse flow rate must be regulated so that when the drill enters a high pressure area, the valve will completely close and prevent reverse flow or blowout of fluid.

Figure 2:
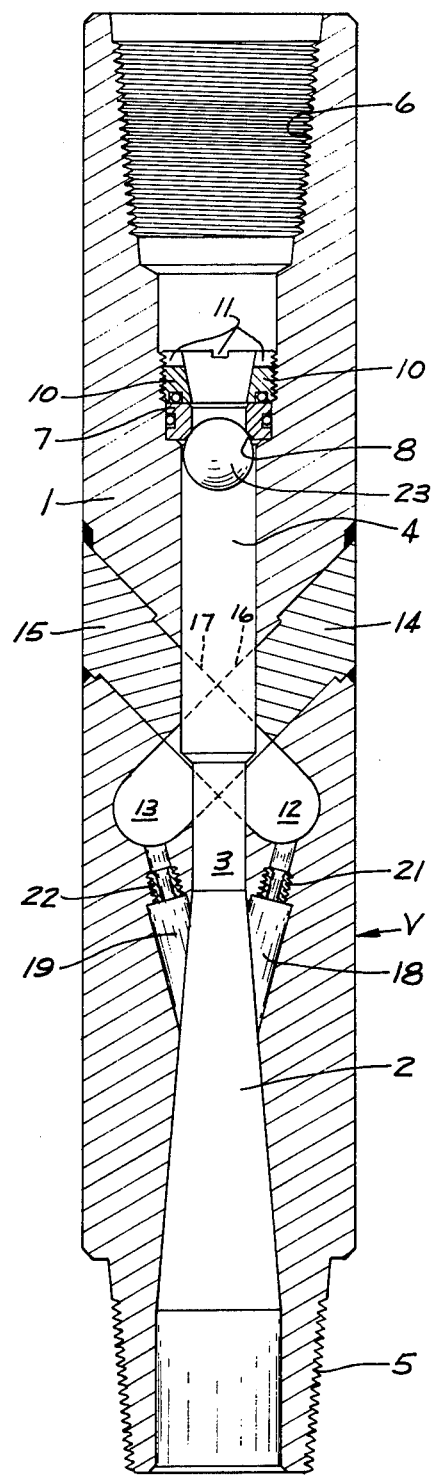
FIG. 2 is a vertical elevation, in section, similar to FIG. 1 but showing the valve in its closed position for preventing reverse flow therethrough.

If the pressure below the drill bit is greater than the pressure in the drill string, the fluid will start to flow upwardly through the drill string and when reverse flow reaches a predetermined rate, a ball member 23, which is disposed in either one of the pockets 12 and 13, will be displaced into the flowbore and forced into the contact with the valve seat 8 as in FIG. 2. The diameter of the ball 23 is slightly less than the diameter of the recesses 12 and 13 and the upper flowbore section 4.

The ball 23 is displaced because of a pressure differential created between the recesses and the restricted bore of throat section 3. This pressure differential exists because the entire hydraulic head within the recess is in the form of pressure energy, whereas the same hydraulic head in the throat 3 is in the form of kinetic energy embodied in the fluid flow. The pressure at the throat or intermediate section 3 is therefore lower than that in the recesses 12 and 13. This is in accordance with the well established principle outlined in hydraulic textbooks, e.g., "Fluid Dynamics" by Daily and Harleman (Addison-Wesley, 1966), and which is expressed quantitatively by the well known equation of Bernoulli.

When the orifice bushings 21 and 22 are blanked off so as to allow no communication of pressure, the initial pressure differential acting on the ball 23 will be at a maximum. However, if an orifice is fitted into the bushing, some reduction of pressure will take place in the recesses due to this communication. The larger the orifice the higher the flow rate required to cause the ball 23 to be displaced from its recess into the flowbore for engagement with the valve seat 8, as illustrated in FIG. 2.

Subsequently, when the pressure below the valve assembly V becomes less than the pressure above, the ball 23 will drop down through the upper flowbore section 4 and be guided by one of the guide areas 16 or 17 into one of the recesses or pockets 12 or 13 respectively. Since the recesses are symmetrically disposed about the axis of the flowbore, the ball does not prefer one to the other and depending on the fluids, the plumbness of the drill string and other variables may enter either one. Thx passages 18 or 19, or the clearance between the ball 23 and the recess in which it reenters, will allow the fluid displaced by the ball to escape from the recess. When the ball has returned to either one of the recesses 12 or 13, the drilling process can be resumed.

From the foregoing description, it can be seen that the check valve of the present invention offers several advantages. It permits some reverse flow of fluids, so a drill string can be lowered into the well bore without extra weight to overcome the buoyancy of the drilling mud therearound, yet it prevents excessive reverse flow which might occur upon drilling entry into an extreme high pressure area. The closure member is disposed in recesses out of the main flow stream, reducing erosion wear and by providing a pair of recesses for the closure member, erosion wear is further reduced. The resulting check valve assembly V is simple, effective and efficient.

Although only one embodiment of the invention has been described herein, many changes in the size, shape, materials, as well as the details of construction, may be made without departing from the spirit of the invention. It is therefore intended that the scope of the invention be limited only by the claims which follow.

I claim:

1. A check valve assembly for permitting unrestricted flow in one direction and limited flow in the reverse direction comprising:
   a. a valve body having a longitudinal flowbore therethrough comprising first and third concentric sections connected by a second concentric section of restricted diameter;
   b. seat means carried by said valve body at one end of said third flowbore section;
   c. a pair of discreet recesses in said valve body communicating with said flowbore near the junction of said second and third flowbore sections and inclined from said flowbore radially and longitudinally away from said third section;
   d. ball closure means for disposal in either one of said recesses and movable into said flowbore for sealing engagement with said seat means, in response to a predetermined rate of reverse flow through said check valve assembly, to block reverse flow of fluid through said check valve assembly;
   e. a pair of elongate equalizing passages each having one end communicating with said first flowbore section and another end communicating with a respective one of said recesses, each of said equalizing passages having at least a part thereof adjacent said one end which is radially and longitudinally inclined with respect to said first flowbore section and adapted to receive replaceable orifice means, and
   f. means preventing direct communication between said flowbore and a portion of each of said equalizing passages intermediate the ends of said equalizing passage.

2. A check valve assembly as set forth in claim 1 in which said first flowbore section is frusto-conical converging toward said second and third sections, which are cylindrical.

3. A check valve assembly as set forth in claim 1 wherein said equalizing passages communicate with said recesses at points in said recesses such that, when said ball closure means is disposed in either of said recesses, the points of direct communication of said recess with said flowbore and said equalizing passage are on generally opposite sides of said ball closure means.

4. A check valve assembhy as set forth in claim 3 in which each of said equalizing passages is provided with replaceable orifice means, the changing of which regulates the reverse flow rate to which said ball closure member is responsive for blocking flow through said check valve assembly.

5. A check valve assembly as set forth in claim 1 in which each of said recesses is cylindrical and of a diameter slightly larger than the diameter of said ball closure means and whose axes intersect the axis of said flowbore at an inclined angle toward said third flowbore section.

6. A check valve assembly as set forth in claim 5 in which said recesses are symmetrically disposed and diametrically opposed to each other relative to said flowbore axis.

* * * * *